United States Patent [19]
Haywood

[11] Patent Number: 6,006,162
[45] Date of Patent: Dec. 21, 1999

[54] AUTOCALIBRATING MULTICHANNEL ANALYZER AND METHOD FOR USE

[75] Inventor: Susan E. Haywood, Oak Ridge, Tenn.

[73] Assignee: EG&G Ortec, Oak Ridge, Tenn.

[21] Appl. No.: 08/864,773

[22] Filed: May 29, 1997

[51] Int. Cl.$^6$ .................................... G01J 3/02
[52] U.S. Cl. ......................... 702/23; 250/339.07
[58] Field of Search .................... 702/23; 73/23.37; 250/339.07; 378/207

[56] References Cited

U.S. PATENT DOCUMENTS

| | | | |
|---|---|---|---|
| 4,043,756 | 8/1977 | Sommervold | 23/230 |
| 4,883,065 | 11/1989 | Kelen | 128/711 |
| 4,891,716 | 1/1990 | Andersen | 360/31 |
| 5,710,713 | 1/1998 | Wright et al. | 364/498 |
| 5,715,173 | 2/1998 | Nakajima et al. | 364/500 |
| 5,798,526 | 8/1998 | Shenk et al. | 250/339.09 |

*Primary Examiner*—Marc S. Hoff
*Assistant Examiner*—Linh Nguyen
*Attorney, Agent, or Firm*—Pitts & Brittian, P.C.

[57] ABSTRACT

An autocalibrating multichannel analyzer (MCA) for spectroscopy. The autocalibrating MCA includes a data collection unit, wherein is included a detector and a multichannel buffer (MCB). The detector produces an analog signal representing selected parameters of a radioactive sample. The MCB includes a signal conditioner for converting the analog signal into a digital signal and a processor for sorting and counting the signals received from the detector. The interface unit includes a processor for data analysis, at least one output device to display information, at least one input device to accept commands, at least one memory device for storing data, and an automatic calibration system to correct data for errors introduced by the data collection unit and the surroundings. The automatic calibration system compares parameters collected from a known calibration sample against parameters stored in the system with little intervention by the operator. The results of the automatic calibration system are applied to a sample to establish the relationship between channel number and signal strength.

8 Claims, 4 Drawing Sheets

AUTOCALIBRATING MULTICHANNEL ANALYZER AND METHOD FOR USE

TECHNICAL FIELD

This invention relates to the field of multichannel analyzers (MCAs) for spectroscopy and more particularly concerns a MCA which automatically calibrates data collected to establish the relationship between channel number and signal amplitude.

BACKGROUND ART

A multichannel analyzer counts, stores, analyzes, and displays data measured from a sample source. It is necessary to calibrate the MCA to account for the effects related to differing source-detector geometries. Calibration of a MCA comparing the measured peak values of a known source to a standardized value for that source in order to determine the operating gain of the particular MCA configuration.

Calibration typically is a manual operation, wherein a sample of known composition, because of its nature, produces in the MCA a histogram with well-defined, isolated peaks and a small statistical uncertainty. The expected typical values of the peaks are well established physical data for the known sample. The operator then compares the locations and heights of the peaks collected from the known sample to the expected values for that known sample. This is accomplished by having the operator identify a peak at an appropriate channel and compare the measured value at that channel to the expected value. Next, the operator must set the measured values to correspond to the expected values for the known sample. This is accomplished by having the operator select the peak at the appropriate channel and enter the expected value for that channel. The calibration system then establishes the relationship between the measured value and the expected value and computes the necessary adjustment to correct for any inconsistency. This process is repeated for several peaks to establish the proper correlation between measured values and actual values. The larger the number of peaks for which the measured value and the expected value are available, the greater the accuracy of the correlation and the greater the time necessary to complete the calibration.

Next, the relationship between the measured data and the parameters corresponding to the matched element is determined. The calibration relationship is applied to subsequently measured data from samples of unknown composition to correct the measurements for errors introduced in the data collection process and convert the analysis results from peak position in channels to peak position in energy.

Further, calibration for the MCA must be set every time changes are made to the MCA, such as changing the parameters or the detector. Each new detector produces a signal of a different energy, resulting in a different channel to energy relationship. Moving the MCA alters the effects introduced by the surroundings of the MCA.

As a result, calibration of the MCA is a time consuming process which must often be repeated. The frequency of repetition increases the chance that errors will be made in the calibration process because of the amount of precise physical data which must be manually entered into the process.

Automatic calibration of the MCA is accomplished by having the MCA compare the data collected from a sample of known composition with an internal library of data containing the expected values. The calibration is performed by determining the closest possible match of the measured data to an element of the internal library.

Accordingly, one object of the present invention is to substantially reduce the time necessary to calibrate the MCA by automatic calibration.

An additional object of the present invention is to reduce the amount of precise information which must be entered by the operator to reduce the likelihood of operator error.

A further object of the present invention is to allow calibration results to be archived for future use.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
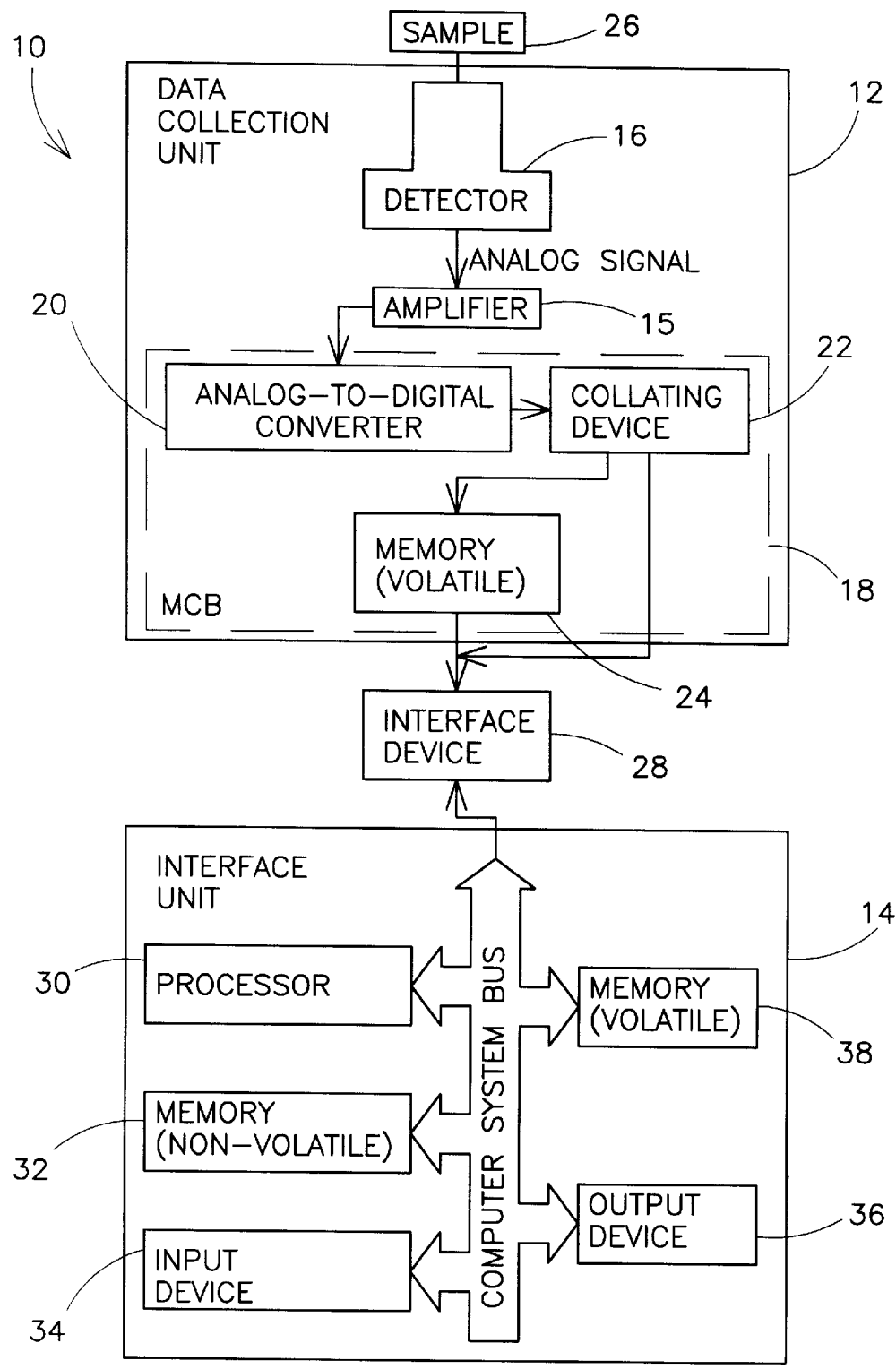
FIG. 1 illustrates a block diagram of the autocalibrating multichannel analyzer.

An autocalibrating multichannel analyzer (MCA) for nuclear spectroscopy is indicated in the figures generally at 10. Of primary interest in nuclear spectroscopy, is pulse height analysis (PHA). PHA events are signal pulses originating from a detector 16, and the characteristic of interest is the pulse height or voltage, which is proportional to the particle or photon energy. As pulses arrive over time, the distribution of the count of pulses with respect to pulse height is collected. This distribution, arranged in order of ascending energies, is commonly refer red to as a spectrum. To be useful, the acquired spectrum must be available for storage and/or analysis, and is displayed on a graph whose horizontal axis represents the height of the pulse, and whose vertical axis represents the number of pulses at that height, also referred to as a histogram. The MCA emulator provides meaningful access to the data collection unit 12 by displaying information for the operator and allowing the operator to control the data collection unit 12. Although, the following discussion relates to energy calibration, the present invention can be used to perform efficiency calibration.

A typical MCA includes a data collection unit 12 and an interface unit 14. The data collection unit 12 includes a detector 16, an amplifier 15, and a multichannel buffer (MCB) 18. The detector 16, produces an analog signal representative of the measured photon energy of a radioactive sample 26. The MCB 18 is a detector interface which includes a collating device 22 for sorting and counting analog signals produced by the detector 16, a signal conditioner for converting analog signals to digital signals 20, and a memory device 24 for storing data. The interface unit 14 includes a processor for data analysis 30; at least one means of output 36, for example, a video display monitor; at least one means of input 34, for example a keyboard; and at least one memory device for storing data 32,38, for example, random-access memory (RAM) 38 for volatile storage and a fixed or removable, rotating, magnetic storage device 32 for non-volatile storage. In the present invention, the interface unit is a conventional microcomputer containing appropriate software to allow communication with the data collection unit 12 and to provide data archival and analysis functions. A connection device 28 provides communication between the data collection unit and the interface unit.

Communication with the data collection unit 12 and data archival functions are made by methods known in the art. Further, it is obvious to one skilled in the art that the interface device and the data collection unit can be incorporated into a single self-contained unit.

Figure 2A:
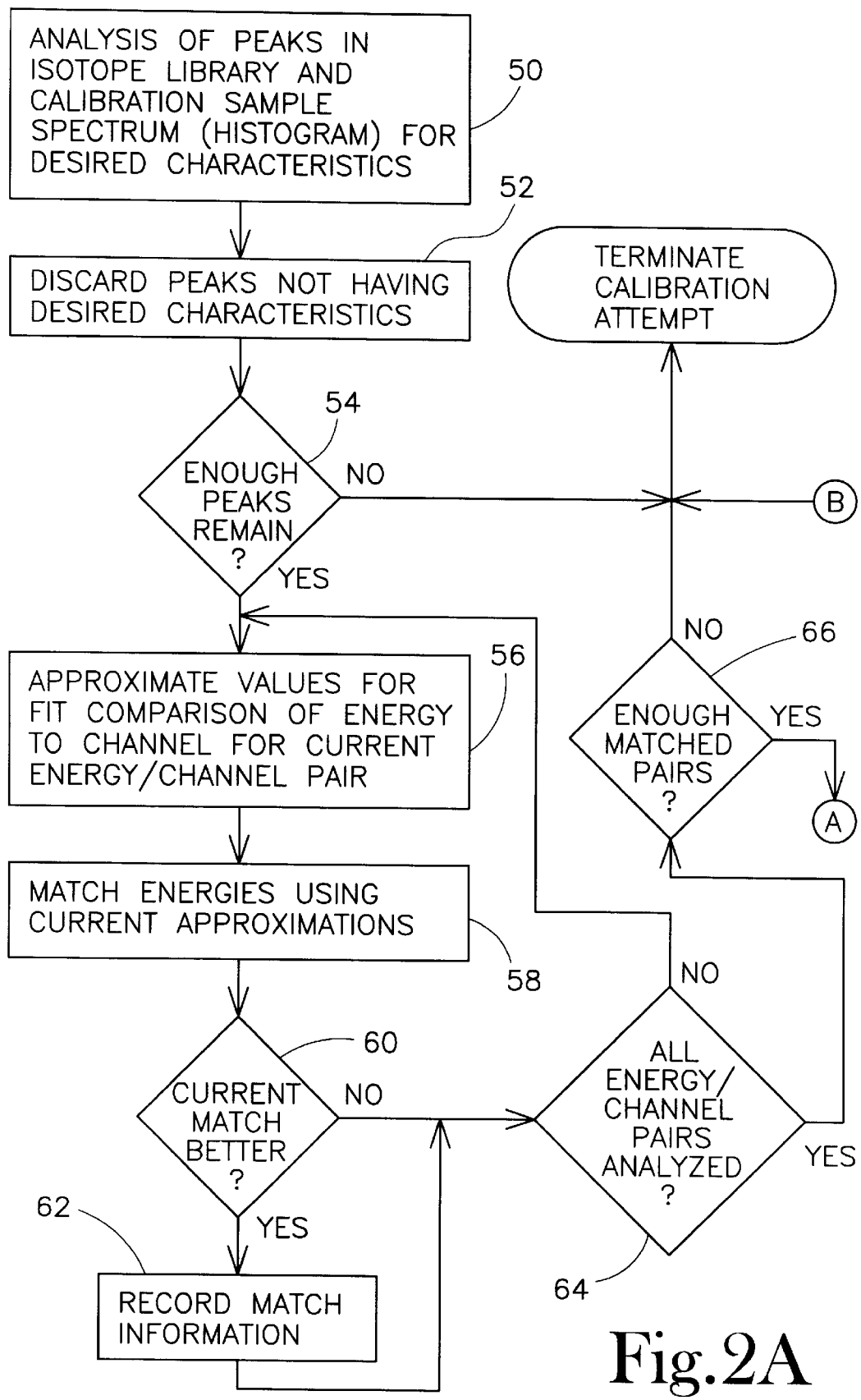
FIG. 2(a) and 2(b) depict the flow of the automatic calibration system generally.
Figure 2B:
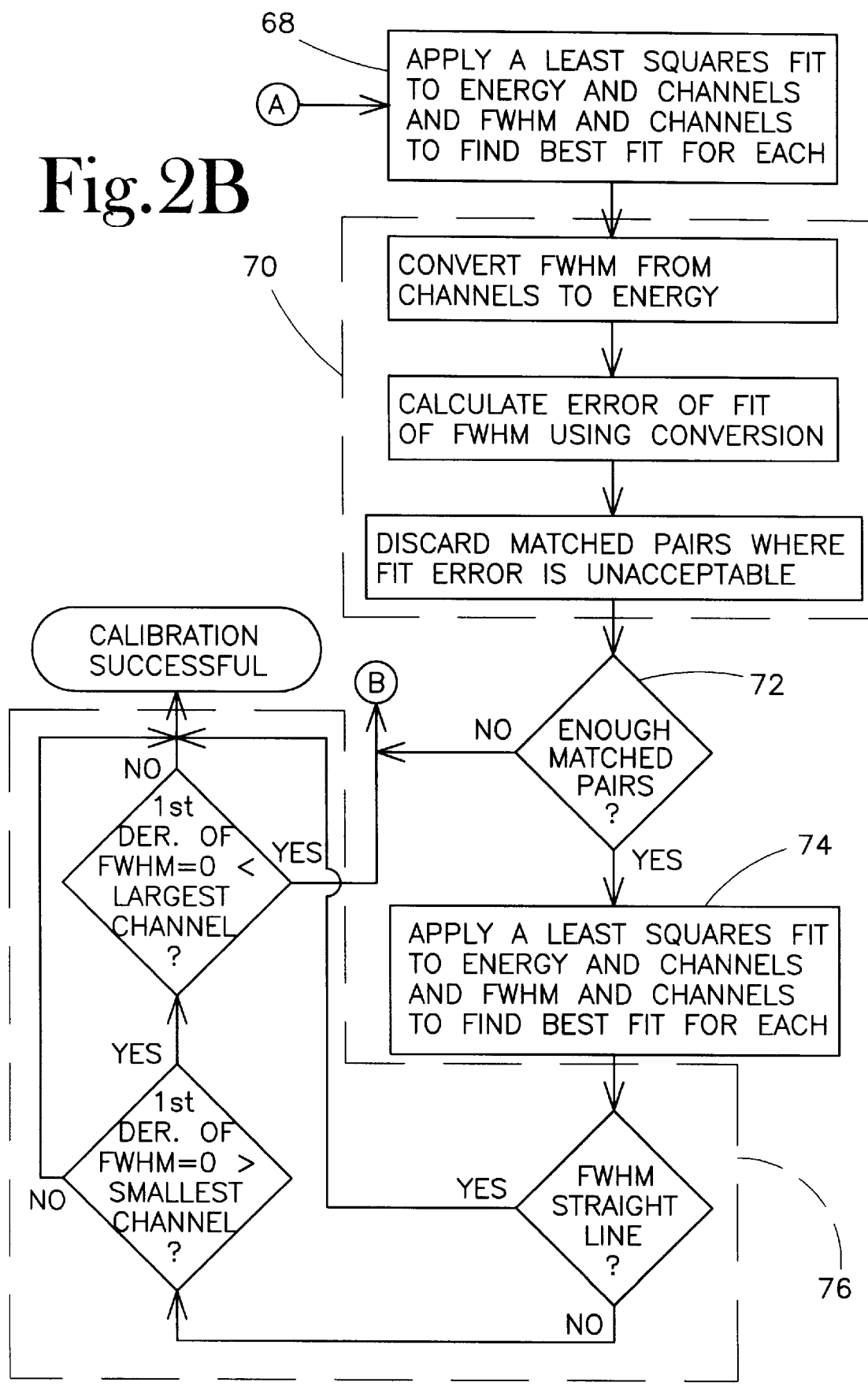

In the present invention, the interface unit 14 includes an automatic calibration system, shown in FIG. 2(a) and 2(b), for converting data received from the data collection unit 12 into information meaningful to the operator. The automatic calibration system includes at least one isotope library, an example of which is shown in Table 1 below, which contains standard energy parameters of isotopes which are commonly used to calibrate spectroscopy devices. The isotope library is stored in a non-volatile memory device 32.

TABLE 1

Isotope Library
Created April 13, 1988 at 10:58:04
Edited April 5, 1995 at 8:19:53

| Isotope | Half-life | Energy (keV) | Emission Probability (%) |
| --- | --- | --- | --- |
| Cd-109 | 436 days | 88.03 | 3.61 |
|  |  | 22.16 | 86 |
|  |  | 24.94 | 17 |
| Ce-139 | 137.7 days | 165.85 | 79.95 |
| Co-57 | 272.4 days | 122.07 | 85.6 |
|  |  | 136.43 | 10.6 |
| Co-60 | 1925.18 days | 1173.24 | 99.9 |
|  |  | 1332.50 | 99.9824 |
| Cs-137 | 30.174 years | 661.66 | 85.21 |
| Sn-113 | 115.09 days | 391.69 | 64.16 |
| Y-88 | 106.66 days | 1836.01 | 99.35 |
|  |  | 898.02 | 95 |
| Hg-203 | 46.64 days | 279.17 | 81.5 |
| Am-241 | 432 years | 59.54 | 36.3 |

The relationship between the energy and the channel number of a gamma-ray peak is nearly linear. It is described by the equation:

$$E = aC + b + \epsilon f(C) \quad (1)$$

where E represents the energy of a gamma-ray peak, C represents the channel number of a gamma-ray peak, a and b are constants, and $\epsilon$ is small. Ignoring the small term, the above equation can be solved for first approximations of a and b, $$a = \frac{(E_y - E_x)}{(C_y - C_x)} \quad (2)$$

and $$b = E_y - aC_y \quad (3)$$

where x and y represent two energy/channel pairs. By using these approximations to find the best fit for both the peak height, or energy, as related to channels, and the peak shape, or full-width at half maximum (FWHM) measuring detector resolution, to channels, a device for calibrating measured values with known values can be accomplished.

Automatic calibration of the autocalibrating MCA 10 is accomplished by comparing the data acquired by the data collection unit 12 with the data in the isotope library. First, a calibration sample 26 with known properties is placed near the detector 16. The calibration sample 26 is selected from a known source with isolated peaks and little statistical uncertainty. Preparation of the calibration sample 26 is accomplished by methods known in the art. The detector 16 produces an amplified analog voltage pulse with a magnitude proportional to the known energy of a photon. The MCB 18 receives the analog voltage pulse from the detector 16 and converts it to a digital signal. The digital signal, or channel number, represents the amplified pulse height of the event. The MCB 18 sorts and stores each event by the channel number. Automatic calibration can be performed upon the calibration spectrum which is stored in either the memory device of the data collection unit 12 or the memory device of the interface unit 14.

Referring now to FIG. 2(a), after the data collection unit 12 has finished acquisition of data from the calibration sample 26, the peaks in the isotope library and in the calibration spectrum are examined, as indicated at 50. The number of isolated peaks in the isotope library and the number of strong peaks collected from the calibration sample 26 are counted and peaks lacking sufficient strength, for example a strength less than or equal to 5, or, in the case of closely proximate peaks, for example, peaks having a separation of less than 0.05 keV, peaks having the smaller emission probability are discarded to improve calculation time, as indicated at 52. If enough peaks do not remain in both the isotope library and the data collected from the calibration sample 26, then the automatic calibration attempt terminates, as indicated at 54.

For each spectrum peak channel number and each library peak energy, a energy/channel pair is formed. Using each energy/channel pair, first approximations for the values of a and b are calculated using Equations (2) and (3), as shown in 56. These approximations are used to calculate energies for all the spectrum peaks, as indicated at 58 and shown in detail in FIG. 3.

Figure 3:
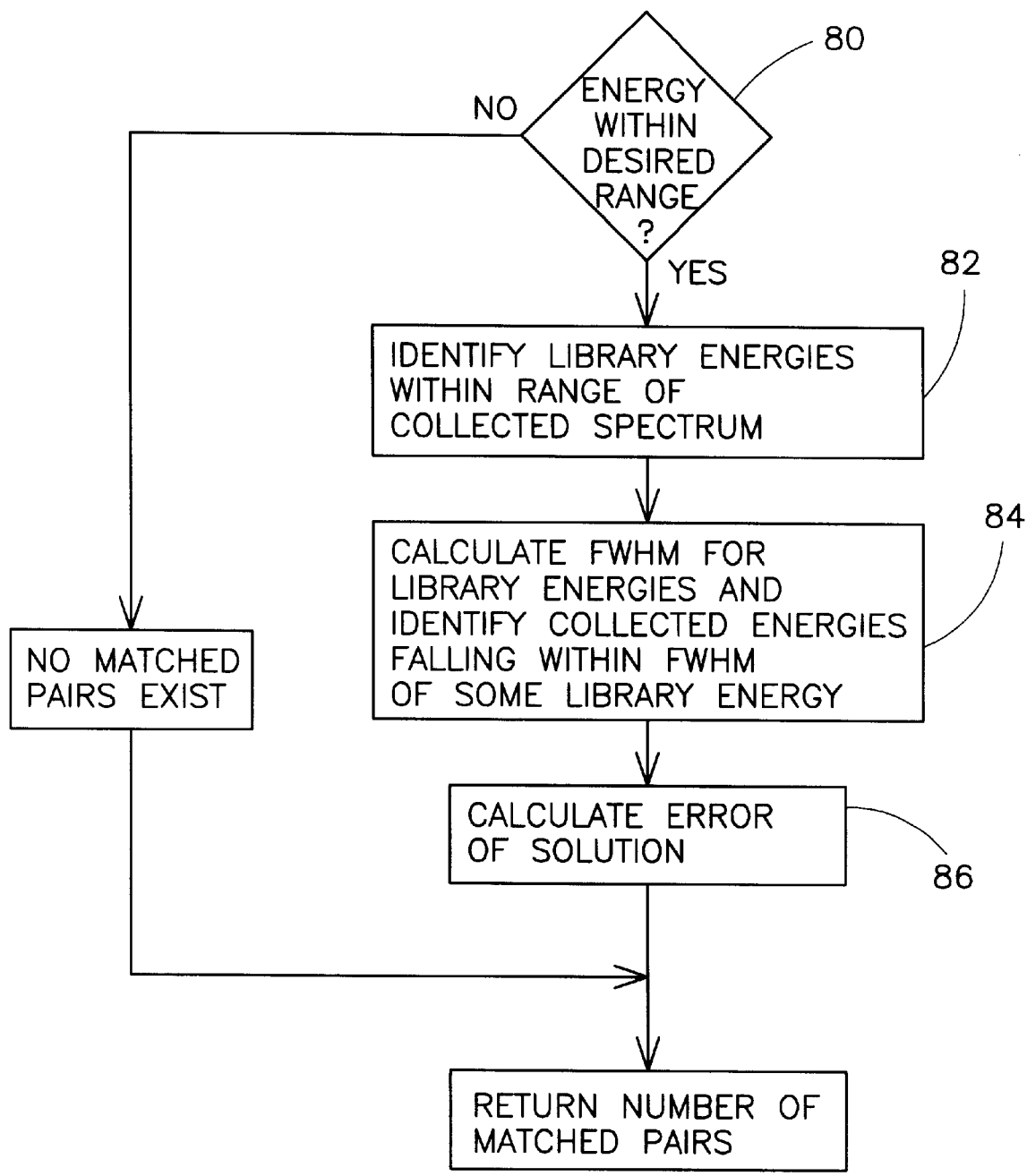
FIG. 3 depicts the flow of energy matching mode of the automatic calibration system.

Referring flow to FIG. 3, if energy data collected from the calibration sample 26 produces a non-physical result, then no match is considered to exist for that energy/channel pair, as indicated at 80. For example, in the present invention, a non-physical condition is to produce energy outside the spectral range of energies between 0 and 15,000 keV. Prior to comparison, the library energies within the range of the collected spectrum are identified, as indicated at 82. Next, the magnitude of the energy data collected from the calibration sample 26 is compared to the corresponding energy data from the isotope library to identify matched pairs. A pair of one peak from the isotope library and one peak from the data collected from the calibration sample 26 is considered matched if the energy of the peak from the calibration sample 26 falls within a range specified by the energy from the isotope library plus or minus the full width at half maximum (FWHM), as indicated at 84. When a matched pair is identified, the match is recorded and the error associated with this solution, calculated as, $$e = e + (E - E_i)^2 \quad (4)$$

is updated, as indicated at 86.

Returning to FIG. 2(a), the number and quality of matches from each energy/channel pair is compared to the previous best result, as indicated at 60, and information, which includes the greatest number of matches and the linear approximation of the energy resulting from the energy/channel pair which produces the greatest number of matches and the least error, is stored, as indicated at 62. Analysis continues until all possible energy/channel pairs have been analyzed, as indicated at 64. If enough matches are not found to further attempt calibration, the automatic calibration attempt terminates, as indicated at 66.

Referring now to FIG. 2(b), using the "best" approximate calibration, as determined at 60 and 62, and rejecting any spectrum peaks and library peaks with no corresponding match in the other, a least squares fit both to channel and energy and to channel and FWHM to find the best fit for the quadratic equation, $$f(x)=jx^2+kx+l \qquad (5)$$

where f(x) represents energy or FWHM as applicable, j is the quadratic, k is the s,lope, and 1 is the intercept and the coefficients j, k, and 1 correspond to the appropriate function, indicated at 68. A second check on the accuracy of the solution is accomplished by comparing the fitted FWHM values with the peak FWHMs which were calculated in channels and are converted to energy for the comparison. Any matched pairs where the error correlation of the FWHM fit is unacceptable are discarded, as indicated at 70. For example, in the present invention, a peak producing an error in the FWHM fit of greater than 25% is discarded. If enough matched pairs within acceptable error margins do not remain, the automatic calibration attempt is terminated, as indicated at 72.

Next, a least squares fit on the remaining data is applied a second time both t o channel and energy and to channel and FWHM to find the best fit to Equation (5) for both energy and FWHM, as indicated at 74. The success of the automatic calibration attempt is verified if the FWHM is represented by a straight line (i.e.,j=0) or if the solution to Equation (5) where $$x = \frac{-k}{2j} \qquad (6)$$

does not lie between the smallest spectrum channel and the largest spectrum channel, as indicated at 76.

After successful completion, automatic calibration system displays a tabular and a graphical representation of the calibration results as applied to the calibration spectrum. If desired, the calibration results can be archived in a non-volatile memory devices 32 of the interface unit 14 for future or recurrent use. The autocalibrating MCA 10 is then ready to analyze other samples. When desired, the current calibration result or a previously archived calibration result is applied to data from a sample containing unknown components previously archived or data from a newly acquired sample to correct for amplification, variations in the data collection unit and/or the surroundings.

From the foregoing description, it will be recognized by those skilled in the art that an autocalibrating MCA offering advantages over the prior art has been provided. Specifically, the MCA provides a system for automatically calibrating data to compensate for errors introduced by the surroundings and the data collection unit 12 with limited operator intervention, substantially reducing the time needed to receive data collected in a useful form.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. An automatic calibration system in a gamma ray spectroscopy system, said automatic calibration system comprising:
    a calibration source emitting a plurality of gamma ray energies;
    at least one memory device for storing a library of gamma ray peak energy values characteristic of at least one known component including said calibration source;
    a multichannel analyzer for detecting said plurality of gamma ray energies emitted from said calibration source as a calibration spectrum and, for each of said plurality of gamma ray energies, recording at least a peak channel number;
    a processing device in electrical communication with said multichannel analyzer and said at least one memory device, said processing device for calculating a calibration function using each said peak channel number and said library of gamma ray peak energy values; and
    a storage device for storing said calibration factor for later application to a gamma ray spectrum obtained from an unknown source.

2. The automatic calibration system of claim 1 wherein said processing device progressively selects a set of two said peak channel numbers and two said gamma ray peak energy values, computes a linear approximation of said calibration function for each of all possible sets, and sets said calibration function equal to said linear approximation which best approximates a relationship between said calibration spectrum and said library.

3. The automatic calibration system of claim 1 wherein said processing device progressively selects a set of two said peak channel numbers and two said gamma ray peak energy values, computes a linear approximation of said calibration function for each of all possible sets, applies said linear approximation to said calibration spectrum and assigns an energy value to each said peak channel number, calculates an error function measuring an accuracy of a match between said peak channel number energy values to said gamma ray peak energy values, and sets said calibration function equal to said linear approximation having a best said error function.

4. The automatic calibration system of claim 3 wherein said processing device verifies said calibration function using a least squares fit.

5. A method for automatically calculating a calibration function of a gamma ray spectroscopy system for later use, said method comprising the steps of:
    (a) selecting a calibration source emitting a plurality of gamma ray energies;
    (b) selecting a library of gamma ray peak energy values characteristic of at least one known component including said calibration source;
    (c) acquiring a calibration spectrum from a calibration source, including a peak channel number for each of said plurality of gamma ray energies;
    (d) calculating a calibration function using each said peak channel number and said library of gamma ray peak energy values; and
    (e) storing said calibration function for later application to a gamma ray spectrum obtained from an unknown source.

6. The method of claim 5 wherein said step of calculating a calibration function further comprises the steps of:
    (a) selecting a set of two said peak channel numbers and two said gamma ray peak energy values;
    (b) calculating a linear approximation of said calibration function using said set;
    (c) applying said linear approximation to said calibration spectrum and assigning an energy value to each said peak channel number;
    (d) calculating an error function measuring an accuracy of a match between said peak channel number energy values to said gamma ray peak energy values (e) repeating said steps of selecting a set through said calculating an error function until all possible said sets have been selected; and (f) setting said calibration function equal to said linear approximation having a best said error function.

7. The method of claim 6 further comprising the step of verifying said calibration function by applying a least squares fit.

8. The method of claim 6, prior to said step of selecting a set, further comprising the steps of:

(a) identifying at least three peaks having a statistically significant peak strength; and (b) identifying at least three peaks having a separation allowing accurate determination of said peak channel number for each said peak.

* * * * *